D. Howell,

Nut Machine.

No. 3544. Reissued July 6. 1869.

Witnesses.

Frank Milward.

Samuel Knight.

Inventor.

D. Howell.

By Knight Bros attys.

N. PETERS, PHOTO-LITHOGRAPHER, WASHINGTON, D. C.

United States Patent Office.

DAVID HOWELL, OF LOUISVILLE, KENTUCKY.

*Letters Patent No.* 66,238, *dated July* 2, 1867; *reissue No.* 3,544, *dated July* 6, 1869.

IMPROVED NUT-MACHINE.

The Schedule referred to in these Letters Patent and making part of the same.

*To all whom it may concern:*

Be it known that I, DAVID HOWELL, of the city of Louisville, in the county of Jefferson, and State of Kentucky, have invented a new and useful Machine for Making Machinists' Nuts; and I do hereby declare the following to be a full, clear, and exact description thereof, reference being had to the accompanying drawings, making part of this specification.

This is an improvement in the class of machines for the manufacture of red-hot bars into machinists' nut-blanks; and My invention relates to the construction and co-operation of the parts immediately concerned, and in guiding, severing, shaping, and discharging of the metal.

Figure 1, in the drawings, is a vertical section through the operative parts, taken in the line *x x*, fig. 2.

A is a frame or bed, having guides B and B′, for sliding head-blocks C and D, and guide-blocks E and E′, for the sole and crown-punches F and G, respectively, to secure their acting truly when in motion.

Figure 1:
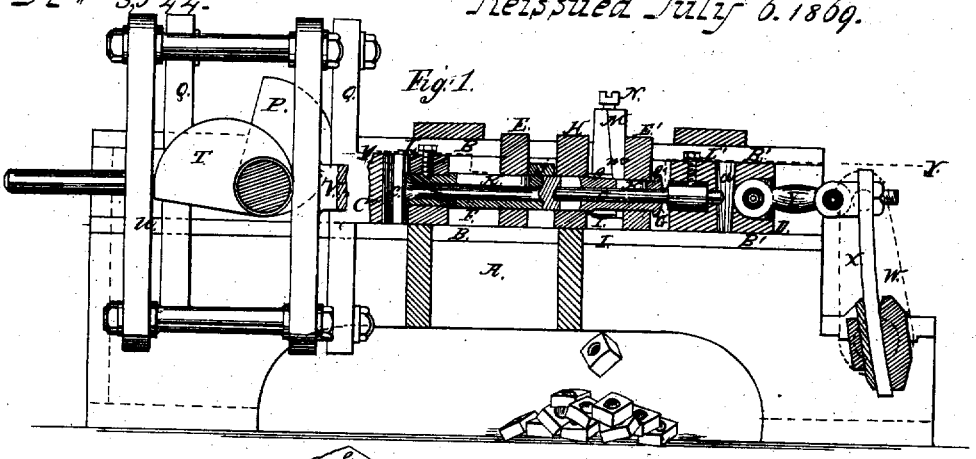
Figure 3:
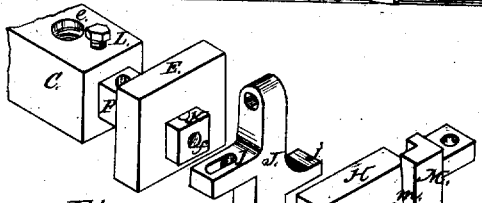
Figure 3 shows the parts which act immediately upon the metal, detached from the machine.
Figure 2:
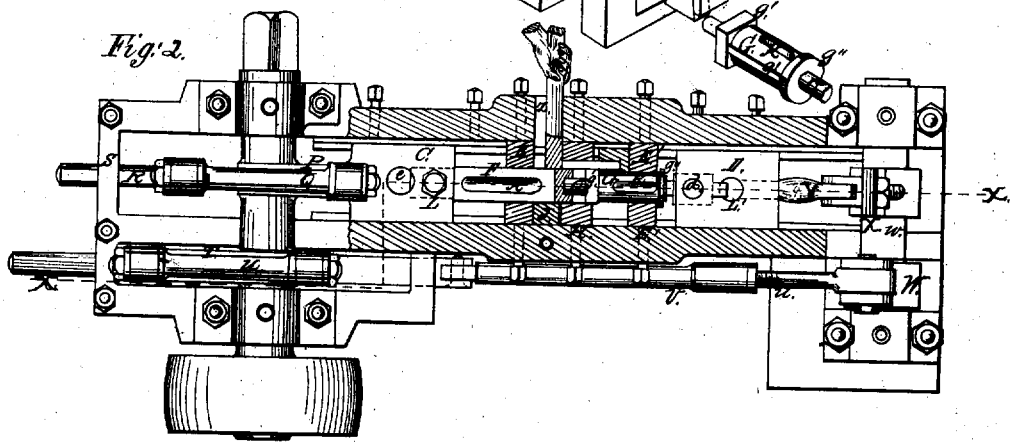
Figure 2 is a combined top view and section on the line *y y*, fig. 1.

Fixed immovably in the frame is the box or die H, a detached view of which is shown in fig. 3.

By means of the die, in conjunction with the sole-punch F, the blank nut is severed from the bar of metal, and within which the blank is also pressed, punched, and formed.

It will appear, from a view of it in fig. 3, that this box or die H is formed with an irregular horizontal opening in it.

On the further side of the opening it is made higher, from top to bottom, and of the form shown, for the insertion of the steel plate I, the form of which is also shown in the same figure, where it is in position for use.

The space in the opening not filled by the steel plate is just sufficient for the head, *g′*, of the crown-punch to enter on one side, and the end of the sole-punch F on the other.

This steel plate and the sole-punch coact, by a shearing-action, and cut off the blank from the hot bar of metal.

A gauge-block, J, having an overhanging lip, *j*, serves as a step and guide to the inserted bar, and also assists to guide the upper and rear sides of the sole-punch F.

The block has another projecting lip on the opposite side, and in that is formed a slot, *j′*, and through this a headed bolt is passed down into the frame, and by means of this slot and bolt the block is rendered adjustable, so as to sever nuts of different sizes.

The sole-punch F is traversed longitudinally by a gradually-increasing hollow or bore, *f*, which opens into a vertical opening in and clear through the sliding head-block C, for the escape of wads or punchings.

The sole and crown-punches are provided with vertical slots K K, for the admission and passage of cold water for cooling them.

M is a gauge-block, the form of which is pretty fully shown in fig. 3.

Its oblique flange *m* holds the steel plate I to its work.

This block is secured to the frame by a screw-bolt, N, in such a manner that it can be elevated or depressed by screwing the bolt out or into the frame.

By lowering the block, the flange will push the steel plate forward as fast as its other end wears away by use.

The inner edge of the flange *m* serves also to guide the crown-punch G when in action.

That crown-punch is confined in and guided by the guide-block E′, and is traversed longitudinally, through a bore through its centre, by the round punch O, which is secured in the sliding head-block D, and which, during the operation of my machine, is advanced, so as to punch an eye in the nut simultaneously with its severance from the red-hot bar of metal.

The crown-punch is shown in perspective in fig. 3. It is composed of two parts, one of which is the round straight rod O, and the other, the sleeve G.

The rod O is fixed in the head-block D, and the sleeve G passes freely over it, and is kept in position by the guide E′.

The sleeve is provided with a leather, *g*, which is received into a corresponding groove in the guide E, and which prevents rotation, and is provided with two heads, *g′ g″*, to limit its advance and return movements.

The head, *g″*, on the rear end, is circular, and prevents its passage forward through the guide-block E′; but head, *g′*, in the forward end, is square, and prevents its passage back through that guide-block, and it is made square, to correspond with the opening for it in the die H, and the surface of the end of the sleeve is made concave in form, in order to give the desired form or crown to the blank nut, when it is compressed between the sole and crown-punches within the die H.

The sleeve, having the perforation K in the top of it, will admit of a constant stream of cold water into it, and upon the eye-punch, to keep it cool, and this without touching the heated bar, or otherwise interfering with the proper action of the machine.

The vertical perforations *c* and *d*, through the head-blocks C and D, allow the insertion of instruments with which to dislodge the punches from these head-blocks, when required to be turned in the heads, or to be ground or replaced by others.

The bolts L and L′ serve to hold the punches F and O securely within their respective heads.

The sole-punch F is reciprocated by a cam, P, rotating in a yoke, Q, the stem R of which, sliding in a guide, S, and the front of which is bolted to the sliding head C.

The eye and crown-punches are reciprocated by a cam, T, the yoke U of which is connected, by a pitman, V, with a rock-arm, W, the shaft *w* of which has a yielding arm, X, composed of a bundle of strong and elastic steel plates, the upper end of which is connected, by pitman Y, with the sliding head D.

The screw in the pitman V enables the latter to be lengthened or shortened.

The use of the elastic arm X will be hereinafter explained.

Z is an aperture through which the bar is fed to the machine.

In the operation, the punches being fully retracted, a metal bar, the end of which has been heated up to a forging-heat, is inserted in the aperture Z, edge up.

The rotation of the cams now advances the eye and crown-punches and the sole-punch in an opposite direction, and the sole-punch forces the bar against the edge of the steel cutter I, which begins to cut it, by the shearing action before mentioned, and at the same time the eye-punch begins to punch the eye, and at the instant the bar is severed and the eye punched, the square head of the sleeve G, and the square head of the sole-punch F, compress the nut within the die H with great force, so as to mould it in the exact form desired, including the perforation.

It is then complete, a nut-blank being formed by every revolution of the cams.

So soon, however, as the blow of compression is given, the sole-punch passes just through the die H, the eye-punch and crown-punch moving in the same direction, the square head, *g'*, of the sleeve G, is stopped by the guide-block E'; but the rod O, or eye-punch, being fixed in the head-block D, is drawn back by it, and leaves the blank unsupported, and then it drops down through the opening to the ground.

In case a wad or blank should stick or fail to escape, the elasticity of the arm X will yield before the parts will break.

In constructing and arranging this spring, it should, of course, be stiff enough to resist ordinary and legitimate pressure, and supple enough to yield before the machine would be broken.

After the completion of the blank, the bar of metal should be turned over, edge for edge, in order that both of the cut sides of the nut may flare downward, or from crown to sole.

It will be seen that the steel plate or cutter I is not made fast to any of the parts, and may be easily removed for the purpose of being sharpened.

The cams may be revolved by any sort of power, and the machine may be made to form as many as sixty blanks per minute.

What I claim as new, and desire to secure by Letters Patent, is—

1. The supporting-matrix or die H, in combination with the cutting-plunger or punch F, operating substantially as described, to carry the nut-blank to a certain point within said matrix, suspend its movement therein, and then discharge the nut from the opposite side to the one of entrance.

2. The steel plate or cutter I, in combination with the gauge-block M, having an oblique flange, *m*, and the die H, when arranged and constructed substantially as described.

3. The sleeve G, with its square head, *g'*, and circular head, *g''*, its slot K, and its feather, its concave head, and its longitudinal bore, constructed substantially as and for the purpose described.

4. The adjustable gauge-block J, having an overhanging lip, *j*, and another overhanging lip on the opposite side of it, provided with the slot *j'*, when constructed substantially as and for the purpose described.

5. The elastic arm X, in combination with the jointed pitman Y and the head-block D, constructed substantially as described.

6. The pitman V, with its screw *v*, in combination with the rock-arm W, its shaft *w*, cam T, yoke U, when constructed and arranged substantially as described.

7. The combination of the sleeve or crown-punch G, the steel cutter I, guide-blocks E and E', matrix or die H, and sole-punch F, when constructed substantially as described.

8. The general construction and arrangement of the parts of the described machine, co-operating to produce the results designed, substantially as described and set forth.

DAVID HOWELL.

Witnesses:
F. D. TOMLIN,
JOHN M. FARRAR.